United States Patent
Partain, III

(10) Patent No.: US 9,266,971 B2
(45) Date of Patent: Feb. 23, 2016

(54) NONIONIC HYDROPHOBICALLY SUBSTITUTED CELLULOSE ETHERS

(75) Inventor: Emmett M. Partain, III, Bound Brook, NJ (US)

(73) Assignee: Dow Global Technologies LLC, Midland, MI (US)

( * ) Notice: Subject to any disclaimer, the term of this patent is extended or adjusted under 35 U.S.C. 154(b) by 244 days.

(21) Appl. No.: 13/811,564

(22) PCT Filed: Aug. 10, 2011

(86) PCT No.: PCT/US2011/047257
§ 371 (c)(1),
(2), (4) Date: Jan. 22, 2013

(87) PCT Pub. No.: WO2012/021625
PCT Pub. Date: Feb. 16, 2012

(65) Prior Publication Data
US 2013/0118743 A1    May 16, 2013

Related U.S. Application Data

(60) Provisional application No. 61/373,436, filed on Aug. 13, 2010.

(51) Int. Cl.
*C08B 11/20* (2006.01)
*E21B 43/26* (2006.01)
(Continued)

(52) U.S. Cl.
CPC ............. *C08B 11/20* (2013.01); *C04B 24/383* (2013.01); *C04B 28/04* (2013.01); *C08B 11/193* (2013.01); *C08L 1/28* (2013.01); *C09K 8/035* (2013.01); *C09K 8/467* (2013.01); *C09K 8/588* (2013.01); *C09K 8/68* (2013.01); *C09K 8/90* (2013.01); *C10M 107/36* (2013.01); *C10M 145/40* (2013.01); *E21B 33/13* (2013.01); *E21B 43/16* (2013.01); *E21B 43/26* (2013.01);
(Continued)

(58) Field of Classification Search
None
See application file for complete search history.

(56) References Cited

U.S. PATENT DOCUMENTS 4,141,843 A * 2/1979 Watson .......................... 507/207
4,217,229 A * 8/1980 Watson .......................... 507/216
(Continued)

OTHER PUBLICATIONS

Glass, Polymers in Aqueous Media, Sau and Landoll, ACS 223, Chapter 18, Date: 1989.
(Continued)

*Primary Examiner* — John J Figueroa

(57) ABSTRACT

Novel nonionic cellulose ethers exhibit a reduced degree of thermal thinning and are efficient thickeners at elevated temperatures. The nonionic cellulose ether has hydroxyethyl groups and is further substituted with one or more hydrophobic substituents. The cellulose ether further has at least one of the properties a), b) or c): a) a retained dynamic viscosity, % $\eta 80/25$, of at least 30 percent, wherein % $\eta 80/25$=[dynamic solution viscosity at 80° C./dynamic solution viscosity at 25° C.] 100, the dynamic solution viscosity at 25° C. and 80° C. being measured as 1% aqueous solution; b) a storage modulus of at least 15 Pascals at 25° C. and a retained storage modulus, % $G'80/25$, of at least 12 percent, wherein % $G'80/25$=[storage modulus at 80° C./storage modulus at 25° C.] 100, the storage modulus at 25° C. and 80° C. being measured as a 1% aqueous solution; c) a critical association concentration of less than 15 ppm as measured by light-scattering.

17 Claims, 3 Drawing Sheets

(51) Int. Cl.
| | |
|---|---|
| *C04B 24/38* | (2006.01) |
| *C04B 28/04* | (2006.01) |
| *C08B 11/193* | (2006.01) |
| *C08L 1/28* | (2006.01) |
| *C10M 107/36* | (2006.01) |
| *C10M 145/40* | (2006.01) |
| *E21B 33/13* | (2006.01) |
| *E21B 43/16* | (2006.01) |
| *C09K 8/035* | (2006.01) |
| *C09K 8/467* | (2006.01) |
| *C09K 8/588* | (2006.01) |
| *C09K 8/68* | (2006.01) |
| *C09K 8/90* | (2006.01) |
| *C04B 103/44* | (2006.01) |

(52) U.S. Cl.
CPC ....... *C04B 2103/44* (2013.01); *C10M 2209/12* (2013.01); *C10M 2209/123* (2013.01); *C10N 2230/02* (2013.01)

(56) References Cited

U.S. PATENT DOCUMENTS

| | | | |
|---|---|---|---|
| 4,228,277 A | | 10/1980 | Landoll |
| 4,368,136 A | * | 1/1983 | Murphey ............ 507/211 |
| 4,523,010 A | * | 6/1985 | Lukach et al. ............ 536/91 |
| 4,529,523 A | | 7/1985 | Landoll |
| 4,784,693 A | | 11/1988 | Kirkland et al. |
| 6,372,901 B1 | * | 4/2002 | Partain et al. ............ 536/90 |
| 6,372,902 B1 | * | 4/2002 | Partain et al. ............ 536/124 |
| 2005/0139130 A1 | * | 6/2005 | Partain, III et al. ......... 106/730 |

OTHER PUBLICATIONS

Zhang, Cellulosic Associative Thickeners, Carbohydrate Polym., 45, 1-10 (2001).

* cited by examiner

NONIONIC HYDROPHOBICALLY SUBSTITUTED CELLULOSE ETHERS

FIELD OF THE INVENTION

This invention relates to novel nonionic cellulose ethers, a process for preparing them, and their uses.

BACKGROUND OF THE INVENTION

Nonionic cellulose ethers are generally known in the art. They are employed in a variety of industrial applications, as thickeners, as water retention aids, and as suspension aids in certain polymerization processes, among others.

U.S. Pat. No. 4,784,693 discloses the use of hydrophobically modified hydroxyethyl cellulose (HmHEC) having 0.2-4 weight percent hydrophobic substitution, an MS (hydroxyethyl) substitution of 1.5-4 and a viscosity of 300-500 cps, measured as a 1 wt.-% aqueous solution, for use as a fluid-loss additive in oil-well cementing.

U.S. Pat. No. 4,529,523 discloses the use of hydrophobically modified cellulose ethers, such as hydrophobically-modified hydroxyethyl cellulose having about 1 weight percent hydrophobic substitution, an MS (hydroxyethoxyl) substitution of 2.5 and molecular weights of 50,000-1,000,000, preferably about 150,000-800,000, as water flooding medium for the recovery of petroleum.

U.S. Pat. No. 4,228,277 discloses nonionic methyl, hydroxyethyl or hydroxypropyl cellulose ethers substituted with long chain alkyl radicals having 10 to 24 carbon atoms in an amount between about 0.2 weight percent and the amount which renders the cellulose ether less than 1% by weight soluble in water. The products exhibit improved viscosifying behavior compared to their unmodified cellulose ether counterparts.

Unfortunately, many of the known water-soluble or water-swellable cellulose ethers used as rheology modifiers or thickening agents exhibit a reversible loss of viscosity at elevated temperatures, referred to as thermal thinning. However, in many end-use applications, such as water, petroleum and natural gas recovery (e.g., cementing wells, hydraulic fracturing, and enhanced oil recovery), geothermal wells (fracturing and cementing), construction (e.g., concrete pumping and casting, self-leveling cement, extruded concrete panels), full-depth road reclamation, ceramics (e.g., as green strength additive), metal working and cutting fluids, thermal thinning is highly undesirable. Accordingly, it would be desirable to find new cellulose ethers which exhibit a reduced degree of thermal thinning and thus would be more efficient thickeners at elevated temperatures.

SUMMARY OF THE INVENTION

Surprisingly, new nonionic cellulose ethers with a reduced degree of thermal thinning and methods of producing them have been found.

One aspect of the present invention are nonionic cellulose ethers having hydroxyethyl groups and being further substituted with one or more hydrophobic substituents, wherein the cellulose ether has at least one of the properties a), b) or c):

a) a retained dynamic viscosity, % $\eta_{80/25}$, of at least 30 percent, wherein % $\eta_{80/25}$=[dynamic solution viscosity at 80° C./dynamic solution viscosity at 25° C.]×100, the dynamic solution viscosity at 25° C. and 80° C. being measured as 1% aqueous solution;

b) a storage modulus of at least 15 Pascals at 25° C. and a retained storage modulus, % $G'_{80/25}$, of at least 12 percent, wherein % $G'_{80/25}$=[storage modulus at 80° C./storage modulus at 25° C.]×100, the storage modulus at 25° C. and 80° C. being measured as a 1% aqueous solution;

c) a critical association concentration of less than 15 ppm as measured by light-scattering.

Another aspect of the present invention is a composition comprising this nonionic cellulose ether.

Another aspect of the present invention is a method of producing the above-mentioned nonionic cellulose ether which comprises the step of first reacting hydroxyethyl cellulose with an alkali metal hydroxide at a mole ratio of alkali metal hydroxide to cellulose of 0.2 to 1.5, and then with a hydrophobe-containing reagent.

Yet another aspect of the present invention is a method of producing the above-mentioned nonionic cellulose ether which comprises the steps of a) reacting cellulose with an alkali metal hydroxide at a mole ratio of alkali metal hydroxide to cellulose of 0.2 to 2.0 to prepare alkali cellulose; and b) alkylating said alkali cellulose with ethylene oxide; and c) reacting with a hydrophobe-containing reagent after adjusting the mole ratio of alkali metal hydroxide to cellulose of 0.1 to 1.0.

Yet another aspect of the present invention is a method which comprises:

providing a fluid comprising the above-mentioned nonionic cellulose ether and using the fluid in an application chosen from the group consisting of:

a geothermal well for water or natural gas recovery that does not involve a drilling fluid, a workover fluid, or a completion fluid, a cementitious formulation, a ceramic application, a metal working and cutting fluid application, or a downhole oil-field application that does not involve a drilling fluid, a workover fluid, or a completion fluid.

Yet another aspect of the present invention is a use of the above-mentioned nonionic cellulose ether for modifying the viscosity of fluids for use in geothermal wells for water or natural gas recovery that does not involve drilling fluids, workover fluids, or completion fluids, cementitious formulations, ceramic applications, metal working and cutting fluid applications, or downhole oil-field applications that do not involve drilling fluids, workover fluids, or completion fluids.

The abbreviation HmHEC is used herein for non-ionic cellulose ethers having hydroxyethyl groups and being further substituted with one or more hydrophobic substituents.

SHORT DESCRIPTION OF THE DRAWINGS

DETAILED DESCRIPTION OF THE INVENTION

Figure 1:
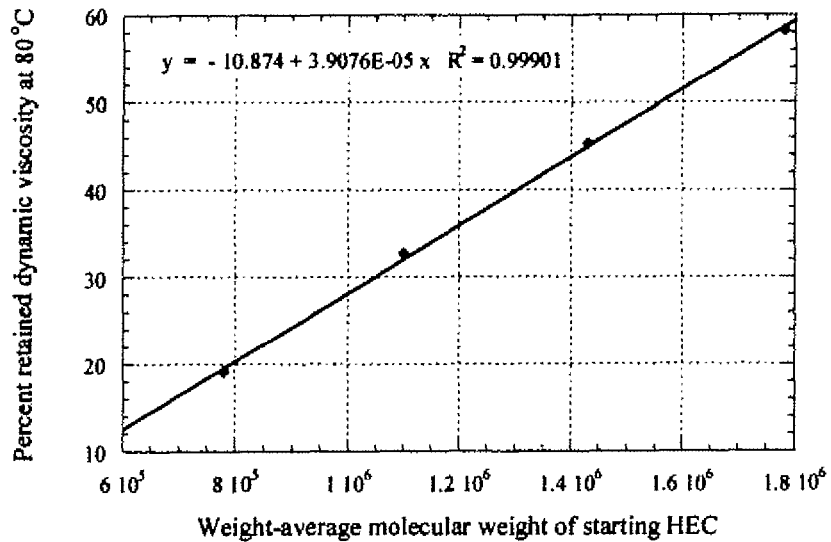
FIG. 1 illustrates the percent retained dynamic viscosity at 80° C. for HmHEC as a function of the molecular weight of the HEC polymer used as a starting material for derivatization.

The nonionic cellulose ethers have hydroxyethyl groups and are further substituted with one or more hydrophobic substituents.

The hydroxyethyl molar substitution EO MS (ethylene oxide molar substitution) of the polymers prepared from hydroxyethyl cellulose is determined either by simple mass gain or using the Morgan modification of the Zeisel method: P. W. Morgan, *Ind. Eng. Chem., Anal. Ed.*, 18, 500-504 (1946). The procedure is also described in ASTM method D-2364 (2007). The EO MS of the nonionic cellulose ether of the present invention generally is from 1 to 5, preferably from 1.5 to 3.5, more preferably from 1.6 to 2.5, most preferably from 1.9 to 2.5.

The nonionic cellulose ethers of the present invention are further substituted with one or more hydrophobic substituents, preferably with acyclic or cyclic, saturated or unsaturated, branched or linear hydrocarbon groups, such as an alkyl, alkylaryl or arylalkyl group having at least 8 carbon atoms, generally from 8 to 32 carbon atoms, preferably from 10 to 30 carbon atoms, more preferably from 12 to 24 carbon atoms, and most preferably from 12 to 18 carbon atoms. As used herein the terms "arylalkyl group" and "alkylaryl group" mean groups containing both aromatic and aliphatic structures. The most preferred aliphatic hydrophobic substituent is the hexadecyl group, which is most preferably straight-chained. The hydrophobic substituent is non-ionic.

The average number of moles of the hydrophobic substituent(s) per mole of anhydroglucose unit is designated as hydrophobe DS (hydrophobe degree of substitution). The DS is measured using the Morgan modification of the Zeisel method as described above, but using a gas chromatograph to measure the concentration of cleaved alkyl groups. An example of a gas chromatographic method that can be used for this purpose is described in ASTM method D-4794 (2009). In the case of alkylaryl hydrophobes such as dodecylphenyl glycidyl ether, the spectrophotometric method described in U.S. Pat. No. 6,372,901 issued Apr. 16, 2002 can be used to determine the hydrophobe DS. The hydrophobe DS is preferably at least 0.0003, more preferably at least 0.001, most preferably at least 0.003, and in particular at least 0.005 moles to 0.012 moles of the hydrophobic substituent(s), per mole of anhydroglucose unit. The average substitution level of the hydrophobic substituent(s) is generally up to 0.012, typically up to 0.010. The upper limit of hydrophobe substitution is determined by the water-solubility of the resulting nonionic cellulose ether. With increasing hydrophobe substitution, a point is reached at which the resulting polymer is water-insoluble. As noted in examples 49 and 50, for a hexadecyl group, the nonionic cellulose ether was rendered water-insoluble at a hydrophobe substitution of about 0.015. This upper limit varies somewhat depending on the specific hydrophobe used and the method in which it is added. More than one type of hydrophobic substituent can be substituted onto the cellulose ether, but the total substitution level is preferably within the ranges set forth above.

The nonionic cellulose ethers of the present invention preferably have a weight average molecular weight of at least 1,000,000, more preferably at least 1,300,000. Their weight average molecular weight is preferably up to 2,500,000, more preferably up to 2,000,000. The weight average molecular weight is measured by size-exclusion chromatography (SEC) using the procedure described below.

The nonionic cellulose ethers of the present invention preferably have a Brookfield viscosity of at least 5000 mPa-sec, more preferably at least 6000 mPa-sec, and even more preferably at least 9000 mPa-sec. The nonionic cellulose ethers of the present invention preferably have a Brookfield viscosity of up to 20,000 mPa-sec, more preferably up to 18,000 mPa-sec, and most preferably up to 16,000 mPa-sec. The Brookfield viscosity is measured as 1% aqueous solution at 30 rpm, spindle #4 at 25.0° C. on a Brookfield viscometer. The Brookfield viscosity is dependent on the hydrophobe substitution, but is also an indication of the molecular weight of the nonionic cellulose ether.

The nonionic cellulose ether of the present invention has at least one of the properties further described below: a) a retained dynamic viscosity, % $\eta_{80/25}$, of at least 30 percent; b) a storage modulus of at least 15 Pascals at 25° C. and a retained storage modulus, % $G'_{80/25}$, of at least 12 percent; c) a critical association concentration of less than 15 ppm as measured by light-scattering.

Preferably, the nonionic cellulose ether of the present invention has two of the properties a), b) and c) in combination. More preferably the nonionic cellulose ether of the present invention has all three properties a), b) and c) in combination.

Most water-soluble polymers, including the nonionic cellulose ethers of this invention, are usually described as viscoelastic, which means that the flow properties of the polymer solutions exhibit components of both viscous and elastic flow. The viscous component is often characterized using the loss modulus which is related to the energy loss in the solution under shear stress, while the elastic component is often characterized using the storage modulus which is related to the energy stored in the solution under shear stress. In an oscillatory experiment, the retained dynamic viscosity is determined by dividing the loss modulus by the frequency of oscillation (in radians).

The retained dynamic viscosity % $\eta_{80/25}$ is preferably at least 35 percent, and more preferably at least 40 percent, wherein % $\eta_{80/25}$=[dynamic solution viscosity at 80° C./dynamic solution viscosity at 25° C.]×100, the dynamic solution viscosity at 25° C. and 80° C. being measured as 1% aqueous solution. The dynamic viscosity is measured at 25° C. and at 80° C. respectively using a TA Instruments AR-2000 oscillatory rheometer with a Couette geometry, a frequency of 0.5 Hertz, an applied stress of 0.1809 Pascals, and a heat-up ramp rate of 2° C./minute. It has been found that according to the present invention generally a retained dynamic viscosity % $\eta_{80/25}$ of up to about 60 percent can be achieved. The dynamic viscosity is a measure of the resistance of a fluid to flow while being subjected to an oscillatory shear stress deformation. In many applications, water-soluble polymers are employed to thicken aqueous systems to permit the suspension of a variety of particulate matter. By the Stokes equation (see for example *Principles of Colloid and Surface Science*, by P. C. Hiemenz, Marcel Dekker, New York, 1977, ISBN 0-8247-6573-7), the settling rate of any particulate suspended in a fluid is inversely proportional to the viscosity of the fluid. Consequently, higher fluid viscosities mean slower settling rates and therefore higher suspending capacities. In many water-soluble polymer applications, in which high suspending capability is a key performance attribute, higher viscosities are preferred. Examples of such applications include water, petroleum and natural gas recovery (e.g., cementing wells, and hydraulic fracturing), construction (e.g., concrete pumping and casting, self-leveling cement, cementing geothermal wells, extruded concrete panels), full-depth road reclamation, ceramics (e.g., as green strength additive), metal working and cutting fluids. However, as noted earlier, many water-soluble polymers exhibit thermal thinning, which is the significant decrease of viscosity at elevated temperature. The loss of viscosity at elevated temperature would result in a loss of suspending power at elevated temperature, which in turn results in a degradation in performance in any application for which a water-soluble polymer is being employed to thicken an aqueous continuous phase, especially when the suspension of particulate matter is an important performance attribute. A high retained dynamic viscosity % $\eta_{80/25}$ is therefore a measure of the retention of the suspending capability of the water-soluble polymer solution at elevated temperature.

Figure 2:
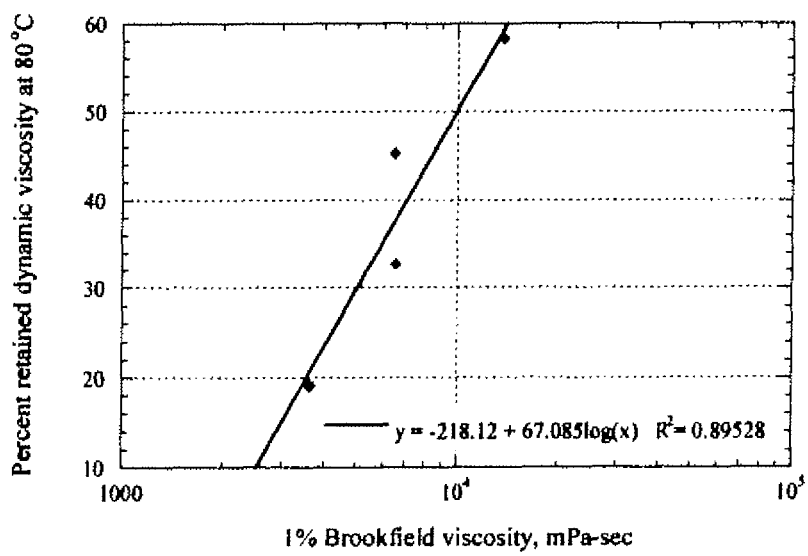
FIG. 2 illustrates the percent retained dynamic viscosity at 80° C. for HmHEC as a function of the 1% Brookfield viscosity of the HmHEC polymer
Figure 3:
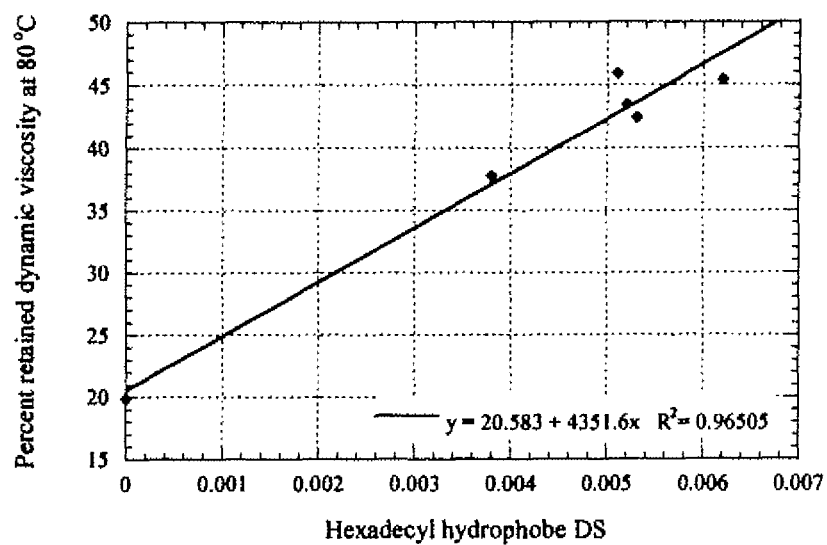
FIG. 3 illustrates the percent retained dynamic viscosity at 80° C. for HmHEC as a function of the hydrophobic substitution (hydrophobe DS).

The molecular mechanism for this unexpected behavior is not completely understood, but high molecular weight and hydrophobe substitution appear to contribute to a high retained dynamic solution viscosity performance at elevated temperature. In FIG. 1, the percent retained dynamic viscosities at 80° C. for the polymers from examples 8 (not according to the invention), 9 (according to the invention), 10 (according to the invention), and 13 (according to the invention) are plotted as a function of the weight-average molecular weights of the starting hydroxyethyl cellulose polymers used to prepare these polymers. These examples were selected for this analysis because they span a range of molecular weights, but all have comparable DS values. The data afford a linear relationship, showing a substantial increase in the retained dynamic viscosity with increasing polymer molecular weight, thus showing the dependence of the retained dynamic viscosity on the polymer molecular weight. In FIG. 2, the percent retained dynamic viscosities at 80° C. for the polymers from examples 8, 9, 10, and 13 are plotted as a function of the Brookfield viscosity of these polymers. These examples were selected for this analysis because they span a range of Brookfield viscosities, but all have comparable DS values. These data were fitted to a logarithmic regression, showing a substantial increase in the retained dynamic viscosity with increasing Brookfield viscosity. Similarly, in FIG. 3, the percent retained dynamic solution viscosities at 80° C. for the polymers from examples 1-6 (according to the invention) and example 7 (not according to the invention) are plotted as a function of the hydrophobe DS. These examples were selected for this analysis because they span a range of DS values, but they were all prepared from the same wood pulp and all have comparable molecular weights. The data afford a linear relationship, showing a substantial increase in the retained dynamic viscosity with increasing hydrophobe DS. These results indicate that the preferred combination of high hydrophobe DS and high molecular weight should give the best retained dynamic viscosity of the resulting nonionic cellulose ether of the present invention. However, it is known that if the hydrophobe DS is excessively high, the resulting hydrophobe-modified hydroxyethyl cellulose polymer will be rendered water-insoluble, and polymer solubility is a prerequisite for solution viscosification. Consequently, there is generally an upper limit on the hydrophobe DS, above which the hydrophobe-modified hydroxyethyl cellulose is rendered water-insoluble. This upper limit varies depending on the molecular weight of the polymer, the hydrophobe type, and other reaction conditions.

The storage modulus is preferably at least 21 Pascals, more preferably at least 24 Pascals at 25° C. The retained storage modulus at 80° C. (% $G'_{80/25}$) is preferably at least 15 percent, more preferably at least 20 percent, wherein % $G'_{80/25}$=[storage modulus at 80° C./storage modulus at 25° C.]×100, the storage modulus at 25° C. and 80° C. being measured as a 1% aqueous solution. The storage modulus is measured at 25° C. and at 80° C. respectively using a TA Instruments AR-2000 oscillatory rheometer with a Couette geometry, a frequency of 0.5 Hertz, an applied stress of 0.1809 Pascals, and a heat-up ramp rate of 2° C./minute. It has been found that according to the present invention generally a storage modulus of up to 50 Pascals can be achieved. Also, generally a retained storage modulus % $G'_{80/25}$ of up to 30 percent can be achieved.

The storage modulus is a measure of the elastic properties of the viscoelastic fluid and is used to describe the gel properties or gelation of polymer solutions. A high storage modulus at 25° C. and a high retained storage modulus (% $G'_{80/25}$) are particularly important in hydraulic fracturing. Hydraulic fracturing is a procedure used in oil-field operations to create fissures extending from the borehole into distant rock formations to increase the rate at which petroleum or gas flows from the formation into the borehole, thus increasing the production of petroleum or natural gas from a given well. In hydraulic fracturing, a highly viscous polymer solution is pumped downhole under high pressure, and the high pressure causes fissuring and cracking of the rock formation. To prevent the fissures from closing when the external pressure is removed, solid particles known as proppants are mixed with the viscous polymer solution and are carried far into the fissures and cracks, effectively wedging the fissures open. When the external pressure is removed, the fissures remain open and the desired petroleum or gas can flow from the formation into the borehole. Temperatures downhole often exceed 100° C., and the polymer solution used must have a sufficiently high viscosity at elevated temperature to maintain the suspension of the proppant. However, in addition to high viscosity required to maintain the suspension of the proppant, lightly cross-linked, elastic polymer gels are often used. Such highly elastic gelled systems are preferred to maximize transmission of the fracturing energy (externally applied pressure) through the gel and into the rock formation.

The critical association concentration is preferably less than 14 ppm. In the most preferred embodiments the critical association concentration of the nonionic cellulose ethers of the present invention can even be as low as 10 ppm. The maximum critical association concentration is measured by light-scattering as described in more detail in the Examples.

While not wanting to be limited by a specific molecular theory, it is theorized that the elevated temperature performance of these high molecular weight nonionic cellulose ethers of the present invention is related to intermolecular hydrophobe aggregation and intermolecular polymer chain entanglement. Beside the aggregation of the pendent hydrophobes in the nonionic cellulose ethers of the present invention giving cross-links in solution through hydrophobic bonding, intermolecular polymer chain entanglement can also contribute to the elevated temperature rheological response by forming physical cross-links. In any sufficiently high molecular weight polymer solution of sufficient concentration, there will be extensive intermolecular polymer chain entanglement to give a network or interpenetrating structure. In the absence of either covalent or other cross-linking such as hydrophobe aggregation, any polymer chain entanglement in solution could be separated under modest shear and would not contribute to the formation of the required three-dimensional cross-linked network required for high viscosity. However, the presence of hydrophobe aggregate cross-links between and among these polymer chain entanglement points in aqueous solutions of these nonionic cellulose ethers of the present invention would serve as additional operative cross-linking points, with the effect of increasing the effective cross-link density. Such entanglements persist as long as the hydrophobe aggregates remain intact as the hydrophobe aggregates prevent the polymer chain separation. The hydrophobe aggregate cross-links become thermodynamically favored at elevated temperature, and the extensive intermolecular chain entanglement re-enforced by hydrophobe aggregation tends to resist the thermal coiling (contraction) of these nonionic cellulose ethers of the present invention at elevated temperature, thus resulting in the observed retention of solution viscosity and storage modulus as a function of temperature.

Figure 4:
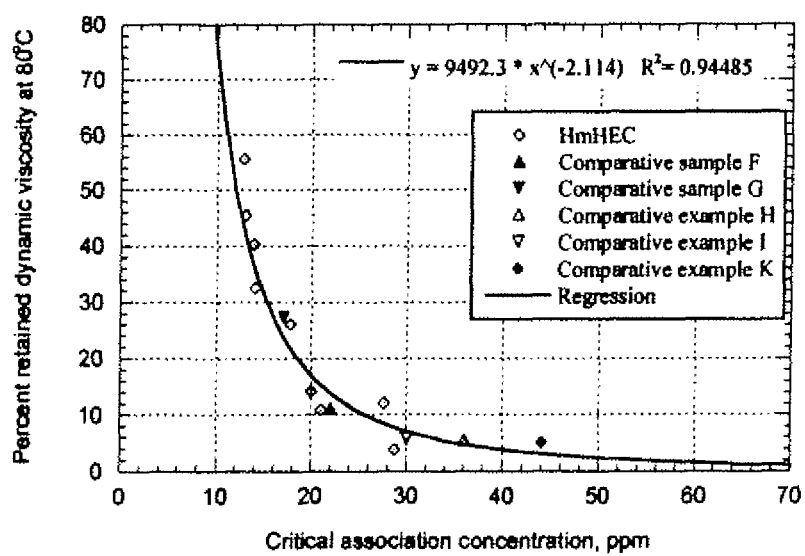
FIG. 4 illustrates the percent retained dynamic viscosity at 80° C. for HmHEC as a function of critical association concentration.

Therefore, an independent measure of the intermolecular interaction of polymer chains of the nonionic cellulose ethers of the present invention should be related to the elevated temperature performance (percent retained dynamic viscosity) of the polymer. One such measure of intermolecular polymer interaction is the critical association concentration. Analogous to the critical micelle concentration in surfactant usage, the critical association concentration is the polymer concentration where individual solvated polymer chains begin interacting with other individual polymer chains (Z. Tuzar and P. Kratochvil, "Micelles of Block and Graft Copolymers", Chapter 1 in *Surface and Colloid Science*, pages 1-83, Plenum Press, New York, 1993, ISBN 0-306-44150-0). FIG. 4 shows a plot of percent retained dynamic viscosity as a function of critical association concentration from Examples 2 (according to the invention), 17 (according to the invention), 31 (according to the invention), 41-44 (according to the invention), 45 (not according to the invention), and J (comparative) (see Table 4). These examples were selected for this analysis because they span a range of performance, as measured by % $G'_{80/25}$. The data were fitted to a power law regression, and decreasing critical association concentration affords increasing percent retained dynamic viscosity. HmHEC's with a lower critical association concentration (e.g., those polymers which exhibit intermolecular interactions at lower concentrations) are also those with superior elevated temperature rheology. Superimposed on the graph are the corresponding data points for Comparative Examples F, G, H, I, and K, which are known HmHEC's that also fall on this regression curve, but because these comparative samples have critical association concentrations greater than 15 ppm, they fail to exhibit the desired elevated temperature performance.

The nonionic cellulose ether of the present invention can be produced in two ways:

According to a first method, hydroxyethyl cellulose is first reacted with an alkali metal hydroxide at a mole ratio of alkali metal hydroxide to cellulose of 0.20 to 1.5 and then with a hydrophobe-containing reagent. According to a second method, cellulose is reacted with alkali metal hydroxide at a mole ratio of alkali metal hydroxide to cellulose of 0.2 to 2.0 to prepare alkali cellulose, and the produced alkali cellulose is reacted with ethylene oxide and with a hydrophobe-containing reagent after adjusting the mole ratio of alkali metal hydroxide to cellulose of 0.1 to 1.0.

Many hydrophobe-containing reagents suitable for use as hydrophobic substituents are commercially available such as 1-bromododecane, 1-bromotetradecane, 1-bromohexadecane, 1-bromooctadecane, 1-bromoeicosane, and 1-bromodocosane. In addition, methods for preparing such hydrophobe-containing reagents, as well as methods for derivatizing cellulose ethers to comprise such hydrophobic substituents, are known to those skilled in the art (for example, U.S. Pat. No. 4,228,277 issued Oct. 14, 1980, U.S. Pat. No. 4,663,159 issued May 5, 1987, U.S. Pat. No. 4,845,175 issued Jul. 4, 1989, and U.S. Pat. No. 5,426,182 issued Jun. 20, 1995).

Preferred hydrophobic substituents include those derived from hydrophobe-containing reagents comprising acyclic or cyclic, saturated or unsaturated, branched or linear hydrocarbon groups having at least 8 carbon atoms, preferably those described further above. The hydrophobe-containing reagent can be attached to the hydroxyethyl cellulose via an ether, 2-hydroxypropoxyl, ester, or urethane linkage. Preferred is the ether linkage. Preferred hydrophobe-containing reagents hydrophobe sources are glycidyl ethers, such as nonylphenyl glycidyl ether, dodecylphenyl glycidyl ether, 3-n-pentadecenylphenyl glycidyl ether, hexadecyl glycidyl ether, octadecyl glycidyl ether, or docosyl glycidyl ether; or alpha-olefin epoxides, such as 1,2-epoxy hexadecane, 1,2-epoxyoctadecane, and their respective chlorohydrins; or alkyl halides, such as octyl bromide, decyl bromide, dodecyl bromide, tetradecyl bromide, hexadecyl bromide, octadecyl bromide, eicosyl bromide; and mixtures thereof.

According to the first method, hydroxyethyl cellulose is first reacted with an alkali metal hydroxide and then with a hydrophobe-containing reagent. Preferably a slurry is prepared of hydroxyethyl cellulose in a diluent, preferably an organic solvent such as methanol, ethanol, n-propyl alcohol, isopropyl alcohol, sec-butyl alcohol, t-butyl alcohol, tetrahydrofuran, 1,4-dioxane, dimethyl ether, toluene, cyclohexane, cyclohexanone, or methyl ethyl ketone. The diluent optionally comprises water. The water content of the diluent is typically from 0 to 25%, by weight. Preferably a hydroxyethyl cellulose is used which has an EO MS of from 1 to 5, more preferably from 1.5 to 3.5, most preferably from 1.6 to 2.5, measured as further described above, and a Brookfield viscosity of from 1000 mPa-sec to 20,000 mPa-sec, preferably from 2000 mPa-sec to 10,000 mPa-sec, more preferably from 4000 mPa-sec to 8000 mPa-sec, measured as 1% aqueous solution at 30 rpm, spindle #3 or #4 (depending on the solution viscosity) on a Brookfield viscometer at 25° C. The weight ratio of the diluent to hydroxyethyl cellulose is preferably from 3 to 20, more preferably from 5 to 10. The slurry of the hydroxyethyl cellulose is contacted with an alkali metal hydroxide, such as sodium hydroxide or potassium hydroxide, preferably with an alkali metal hydroxide in aqueous solution, preferably with a 15 to 50 wt.-% sodium hydroxide solution, particularly preferably with a 20 to 50 wt.-% sodium hydroxide solution. From 0.2 to 1.5, preferably from 0.4 to 1.0 moles of alkali metal hydroxide are utilized, per mole of anhydroglucose unit of the hydroxyethyl cellulose. Generally the alkalization is carried out at a temperature of 10 to 40° C., preferably from 20 to 30° C., and for 15 to 60 minutes, preferably from 25 to 45 minutes. Subsequently the alkalized hydroxyethyl cellulose is reacted with a hydrophobe-containing reagent described further above. Preferably from 0.04 to 0.60, more preferably from 0.08 to 0.16 moles of hydrophobe-containing reagent are utilized, per mole of anhydroglucose unit of the hydroxyethyl cellulose. Generally the reaction with the hydrophobe-containing reagent is carried out at a temperature of 50 to 120° C., preferably from 70 to 85° C., and for 120 to 600 minutes, preferably from 180 to 300 minutes.

According to the second method a) cellulose is reacted with an alkali metal hydroxide to prepare alkali cellulose; and b) the intermediate alkali cellulose is reacted with ethylene oxide and with a hydrophobe-containing reagent. The cellulose (cotton linters or wood pulp) preferably has a weight average molecular weight of from 800,000 to 3,000,000, more preferably from 1,000,000 to 2,000,000 Daltons. Preferably a slurry is prepared of cellulose in a diluent, preferably an organic solvent such as methanol, ethanol, n-propyl alcohol, isopropyl alcohol, sec-butyl alcohol, t-butyl alcohol, tetrahydrofuran, 1,4-dioxane, dimethyl ether, toluene, cyclohexane, cyclohexanone, or methyl ethyl ketone. The diluent optionally comprises water. The water content of the diluent is typically from 0 to 25%, by weight. The weight ratio of the diluent to cellulose is preferably from 3 to 30, more preferably from 10 to 20. The slurry of the cellulose is contacted with an alkali metal hydroxide, such as sodium hydroxide or potassium hydroxide, preferably with an alkali metal hydroxide in aqueous solution, preferably with a 15 to 50 wt.-% sodium hydroxide solution, particularly preferably with a 20 to 50 wt.-% sodium hydroxide solution. From 0.2 to 2.0, preferably from 1.0 to 1.5 moles of alkali metal hydroxide are utilized, per mole of anhydroglucose unit of the cellulose. Generally the alkalization is carried out at a temperature of 10 to 40° C., preferably from 20 to 30° C., and for 15 to 60 minutes, preferably from 25 to 45 minutes. Subsequently the alkalized cellulose is reacted with ethylene oxide. Preferably from 2 to 8, more preferably from 4 to 6 moles of ethylene oxide are utilized, per mole of anhydroglucose unit of the cellulose. Generally the reaction with the ethylene oxide is carried out at a temperature of 40 to 120° C., preferably from 70 to 85° C., and for 30 to 180 minutes, preferably from 60 to 120 minutes. Although the entire amount of the ethylene oxide can be added to alkali cellulose in one stage, the ethylene oxide can be added in two stages, with an intermittent adjustment in the caustic concentration if desired. Most preferably a partial neutralization of the slurry with an acid, such as acetic acid, formic acid, nitric acid, phosphoric acid, or lactic acid is conducted prior to the addition of the hydrophobe-containing reagent. Sufficient acid is added to adjust the caustic concentration of the slurry to 0.10 to 1.00 moles, more preferably from 0.32 to 0.50 moles of alkali metal hydroxide per mole of anhydroglucose unit of the cellulose. The hydrophobe-containing reagent reacts much slower with the alkali cellulose than the ethylene oxide. The hydrophobe-containing reagent can be added to the alkali cellulose simultaneously with the ethylene oxide, but preferably the hydrophobe-containing reagent is added only after the ethylene oxide reaction is complete. Preferably from 0.05 to 0.6, more preferably from 0.10 to 0.24 moles of hydrophobe-containing reagent are utilized, per mole of anhydroglucose unit of the cellulose. Generally the reaction with the hydrophobe-containing reagent is carried out at a temperature of 50 to 120° C., preferably from 75 to 85° C., and for 120 to 600 minutes, preferably from 180 to 300 minutes.

After completion of the reaction according to the first or second method, the reaction mixture can be processed in a known manner, such as neutralization of residual alkali with a suitable acid such as acetic acid, formic acid, hydrochloric acid, nitric acid, or phosphoric acid, recovering the product, washing it with an inert diluent to remove unwanted by-products, and drying the product.

The nonionic cellulose ethers of the present invention are useful in a variety of applications for modifying the viscosity of fluids, for example in water, petroleum and natural gas recovery (e.g., cementing wells, hydraulic fracturing, and enhanced oil recovery), geothermal wells (fracturing and cementing), construction (e.g., concrete pumping and casting, self-leveling cement, extruded concrete panels), full-depth road reclamation, ceramics (e.g., as green strength additive), metal working and cutting fluids. The nonionic cellulose ethers of the present invention exhibit unexpectedly high retention of dynamic solution viscosity and/or retained storage modulus at elevated temperatures. The nonionic cellulose ethers of the present invention are particularly useful in aqueous fluids. This reduced degree of thermal thinning is a desirable property in a variety of commercial applications employing cellulose ethers as thickeners or rheology modifiers, especially in situations where the operation or product will be exposed to elevated temperatures and little or no loss in viscosity is desired. The viscosified fluid preferably has a temperature of at least 60° C., more preferably at least 80° C.

Two examples of commercial applications in which little or no loss in viscosity at elevated temperature is desired are cement slurries for paving, and oil-field hydraulic fracturing.

Figure 5:
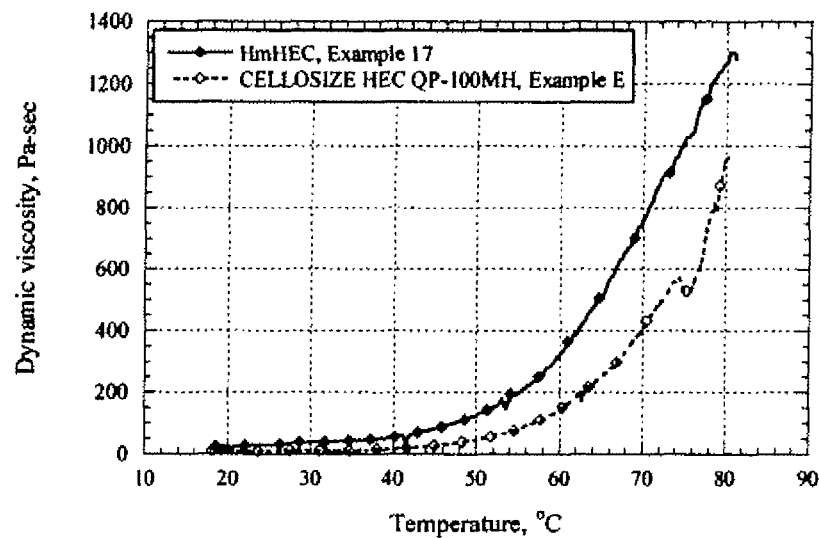
FIG. 5 illustrates the dynamic viscosity of Portland cement comprising HmHEC as a function of temperature.

Cement slurries are used as components in a variety of paving operations, especially in soil cements as described in F. Brouilletter and C. Ryan, U.S. Patent Application 2009/0044726 A1 (Feb. 19, 2009). These cement slurries usually comprise Portland cement, water, and a cellulose ether thickener which stabilizes the cement slurry and prevents premature precipitation of the cement during mixing and transport. A problem with many common cellulose ethers is that at the elevated temperatures encountered in mixing and pouring these cement slurries, the cellulose ethers lose a substantial amount of their viscosity, and thus the undesired cement precipitation occurs. The nonionic cellulose ethers of the present invention are useful in stabilizing these cement slurries, especially at elevated temperatures. To demonstrate the utility of the nonionic cellulose ethers of the present invention, cement slurry compositions of 59.87% Portland cement, 0.10% sucrose, 0.10% cellulose ether, and 40.01% water were prepared and subjected to a dynamic viscosity measurement using a cup and plate fixture from 20° C. to 80° C. at a ramp rate of 1° C./minute (see FIG. 5). One slurry was prepared using CELLOSIZE HEC QP-100MH (example E, comparative) and the other slurry was prepared using a nonionic cellulose ether of the present invention (example 17). The two polymers were of similar molecular weights: $1.52 \times 10^6$ for example 17 and about $1.6 \times 10^6$ for example E (the typical molecular weight range for CELLOSIZE HEC QP-100MH is 1.59 to $1.70 \times 10^6$). As shown in FIG. 5, the dynamic viscosity of the slurry prepared with a nonionic cellulose ether of the present invention exhibited higher viscosity compared with the slurry prepared using CELLOSIZE HEC QP-100MH, and this higher viscosity in the cement slurry thickened with the HmHEC of the present invention was more pronounced at elevated temperature. These results show the improved retention of elevated temperature viscosity in nonionic cellulose ethers of the present invention (example 17) compared with HEC of comparable molecular weight.

Hydroxypropyl guar is commonly used for hydraulic fracturing of petroleum and natural gas wells. Aqueous solutions of hydroxypropyl guar are reacted with polyvalent metal ions such as titanium (IV) to form a dynamic cross-linked system capable of suspending solid particles (called proppants) and prevent them from settling. A. S. Chu and R. K. Prud'homme in *J. Non-Newtonian Fluid Mechanics*, 22, 207-218 (1987) reported that in an oscillatory rheology experiment with a fixed frequency of 1 radian, a 0.96% aqueous solution of hydroxypropyl guar cross-linked with 0.08% titanium acetylacetonate (TYZOR™ AA) affords an elastic polymer gel with a storage modulus of 31.5 Pa. Using the TA Instruments AR-2000 oscillatory rheometer with a Couette geometry and a fixed frequency of 0.5 Hertz (3.14 radians), at an applied stress of 1 Pa, many of the 1% aqueous solutions of the nonionic cellulose ethers of the present invention have a comparable storage modulus value of between 25 and 35 Pa (see Table 3) at 25° C., with some of these nonionic cellulose ethers of the present invention exhibiting storage moduli of substantially greater value (41 to 77 Pa). Higher values for the storage moduli translate to more elastic fluids with higher suspending capacity, which is highly desirable in hydraulic fracturing. In addition, these polymers do not require modification by metallic cross-linking agent, thereby simplifying the formulation and minimizing environmental impact. For these reasons, the nonionic cellulose ethers of the present invention that retains its solution viscosity at elevated temperature is a preferred water soluble thickener in hydraulic fracturing over currently used polymers such as hydroxyethyl cellulose and hydroxypropyl guar.

The present invention is further illustrated by the following examples which are not to be construed to limit the scope of the present invention. Unless otherwise indicated, all percentages and parts are by weight.

Examples 1-50 and A-K

Measurement of Retained Dynamic Viscosity % $\eta_{80/25}$, Storage Modulus at 25° C. and Retained Storage Modulus % $G'_{80/25}$ A TA Instruments AR-2000 oscillatory rheometer fitted with a cup and bob (Couette) geometry was used to measure the solution viscosity of various polymer solutions at elevated temperatures. The temperature was ramped up from 25.0° C. to 100.0° C. at a rate of 2.0° C./minute, with the fixed frequency of 0.5 Hz and the fixed applied stress of 0.1809 Pa (10 µN-m). The storage & loss moduli and phase angle of 1% aqueous solutions of selected cellulose ethers measured by the rheometer were recorded as a function of temperature. To evaluate the data, the dynamic solution viscosities ($\eta'$) at 25° C. and 80° C. were calculated by dividing the loss modulus by the frequency ($\eta'=G''/\omega$, where $\omega=\pi$ radians/second). The percent retained dynamic viscosity at 80° C. (% $\eta_{80/25}$) is obtained by dividing the dynamic solution viscosity at 80° C. by the dynamic solution viscosity at 25° C., and expressing the result as a percent.

Measurement of Molecular Weight by Size-Exclusion Chromatography (SEC):

Mobile Phase

The eluent consists of 0.05 wt % sodium azide ($NaN_3$) and 0.75 wt % β-cyclodextrin (β-CD, purchased from Sigma-Aldrich) dissolved in deionized (DI) water. All eluent compositions were prepared by dissolving $NaN_3$ and β-CD in DI water that had been filtered through a 0.2 µm nylon cartridge. The mobile phase was filtered through a 0.2 µm nylon membrane prior to use.

Sample Preparation

Sample solutions were prepared in the mobile phase to minimize interference from any salt peak. The target sample concentration was about 0.3 mg/ml in order to be sufficiently below C*, the intermolecular polymer chain overlap concentration. Solutions were slowly shaken on a flat bed shaker for 2-3 hours to dissolve the samples, and then were stored overnight in a refrigerator set at 4° C. for complete hydration and dissolution. On the second day, solutions were shaken again for 1-2 hours. All solutions were filtered through a 0.45 µm nylon syringe filter prior to injection.

SEC Equipment

Pump: Waters 2690 set at 0.5 ml/min flow rate and equipped with a filter that consists of two layers of 0.2 µm nylon membrane installed upstream of the injection valve.

Injection: Waters 2690 programmed to inject 100 microliters of solution.

Columns: Two TSK-GEL GMPW columns (7.5 mm ID×30 cm, 17 µm particles, 100 Å to 1000 Å pores nominal) were operated at 30° C.

Detector: A Waters DRI detector 2410 was operated at 30° C.

Calibration

The conventional SEC calibration was determined using 11 narrow PEO standards (linear, narrow molecular weight PEO standards were purchased from TOSOH, Montgomeryville, Pa.). The calibration curve was fit to a first order polynomial over the range of 879 kg/mol to 1.47 kg/mol.

Software

Data were acquired and reduced using Cirrus SEC software version 2.0.

Measurement of Critical Association Concentration (CAC) by Light Scattering:

Sample Preparation

To prepare the stock solution, 20 to 80 mg of polymer powder (depending on the solution viscosity of the polymer) is dispersed in 20 mL of de-ionized water and the mixture is shaken for 4 hours. The stock solution is held at room temperature overnight to insure complete dissolution and hydration. De-ionized water is purified using a Milli-Q® water system (Millipore Company).

To prepare polymer solutions for critical association concentration (CAC) determination, half (10 mL) of the stock solution is diluted by adding de-ionized water (10 mL). Subsequent dilutions are made in the same manner until a concentration of about 0.5 ppm is reached. This procedure yields 12 to 14 solutions for each polymer material, depending on the starting polymer concentration.

Light-Scattering Instrumentation

Brookhaven's BI-200SM goniometer system is used for the critical association concentration (CAC) measurement. The system is equipped with a BI-CrossCor correlator and a Lexel 95 Argon laser at a wavelength of 488 nm.

Measurements

All light-scattering measurements were made at 25° C. at an angle of 90 degrees. The scattered light intensity was recorded at an average of 3 minute intervals with about 100 data points. The standard derivation (SD) was determined from these 100 data points and reported as error in the CAC measurement.

CAC Measurement

Figure 6:
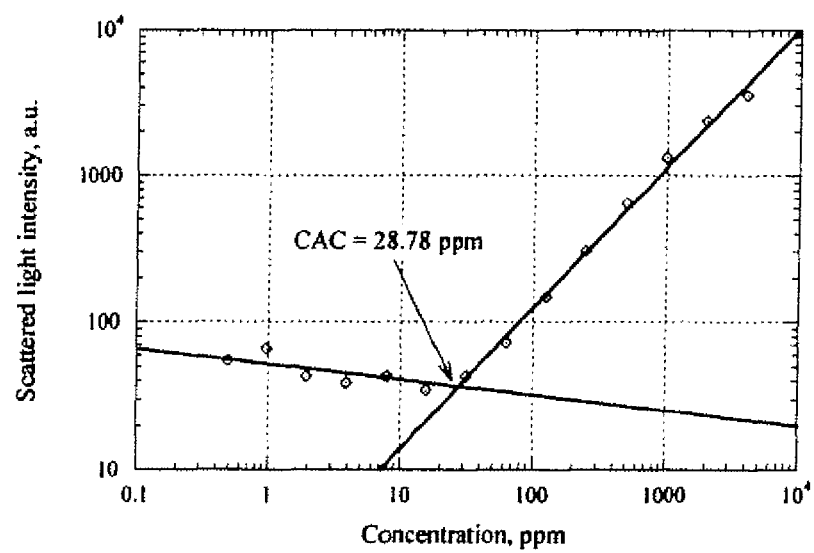
FIG. 6 illustrates how the critical association concentration is determined for HmHEC.

The logarithm of the intensity was plotted as a function of the logarithm of the polymer concentration (for example, see FIG. 6 which is the plot corresponding to Example 41 in Tables 1 and 2). One can see by inspection that the plot comprises two linear portions, one with a steeper slope (upper right) and one with a shallower slope (lower left). The data points in the two portions are independently fit with linear regressions, and the CAC is the concentration at the point of intersection of the two regressions (the cross-over point).

Production of the Nonionic Cellulose Ethers

Example 10

Preparation of HmHEC from CELLOSIZE HEC

A 500 ml resin kettle was fitted with a mechanical stirring paddle, a nitrogen inlet, a rubber serum cap, and a reflux condenser connected to a mineral oil bubbler. The resin kettle was charged with 33.28 g (30.00 g contained) CELLOSIZE® HEC QP-30,000H, 173 g of isopropyl alcohol, and 27 g of distilled water. CELLOSIZE® HEC QP-30000H is a hydroxyethyl cellulose commercially available from The Dow Chemical Company. While stirring the mixture, the resin kettle was purged with nitrogen for one hour to remove any entrained oxygen in the system. While stirring under nitrogen, 4.00 g of 50% aqueous sodium hydroxide solution were added dropwise over five minutes using a syringe. The mixture was then allowed to stir for 30 minutes under nitrogen.

A solution of 4.00 g of 1-bromohexadecane in 10 mL of isopropyl alcohol was added by syringe to the mixture under nitrogen (0.11 moles of 1-bromohexadecane per mole of HEC). Heat was then applied using a heating mantle, and the stirred mixture was heated at reflux for 4.5 hours under nitrogen. The mixture was then cooled to room temperature and neutralized by adding 5.00 g of glacial acetic acid and stirring for 10 minutes. The polymer was recovered by vacuum filtration and washed in a Waring blender: five times with 250 mL of 4:1 (by volume) of acetone/water and twice with 250 mL of pure acetone. The polymer was glyoxal-treated by adding 0.40 g of 40% aqueous glyoxal and 0.25 g of glacial acetic acid to the last acetone desiccation. The polymer was dried in vacuo at 50° C. overnight, yielding 30.63 g of an off-white powder with a volatiles content of 1.03% and an ash content (as sodium acetate) of 1.66%. The 1% aqueous viscosity of HmHEC polymer (corrected for ash and volatiles) was measured at 25.0° C. and found to be 6480 mPa-sec (Brookfield LVT, 30 rpm, spindle #4). The ethylene oxide MS (EO MS) was found to be 1.97 and the hexadecyl DS was found to be 0.0090 by Zeisel analysis.

Examples 8-9, 11-13, and 46-48 were prepared as described for Example 10, but with the commercially available grades of CELLOSIZE® HEC as hydroxyethyl cellulose starting material and the hydrophobe-containing reagents listed in Table 1.

Example 22

Preparation of HmHEC from Cellulose

A three pint, glass Cemco™ pressure reactor was charged with 31.90 g of single cut Borregaard™ UHV-17 wood pulp (30.00 g contained), 350.4 g of isopropyl alcohol and 54.6 g of distilled water. The mixture was stirred for one hour while purging the headspace of the reactor with nitrogen at a rate of 500 mL/min to remove any entrained oxygen. The reactor was fitted with an ice water condenser to prevent evaporative losses of the diluent during the nitrogen purge. The temperature of the slurry was adjusted to 32° C. using a water bath.

After purging for one hour, 46.4 g of 22% (by weight) aqueous sodium hydroxide solution (1.38 moles of sodium hydroxide per anhydroglucose unit) were added to the slurry by syringe, and the temperature of the slurry increased from 32° C. to 35° C. The slurry was stirred for one hour at 35° C., while continuing the nitrogen headspace purge. A charge of freshly distilled ethylene oxide (42.0 g, 5.15 moles of ethylene oxide per anhydroglucose unit) was added to the reactor, and with continuous stirring, the reactor was sealed. The slurry was heated with a water bath to 75° C., and the reaction was continued at 75° C. for 1 hour. After a total of 1 hour at 75° C., the sodium hydroxide concentration of the reaction mixture was adjusted to 0.42 moles of sodium hydroxide per mole of cellulose by adding 10.66 g glacial acetic acid to the reaction slurry by syringe. The slurry was stirred for 5 minutes, then 10.25 g of 1-bromohexadecane were added to the reactor by syringe (0.18 moles of 1-bromohexadecane per anhydroglucose unit). 10 mL of nitrogen-purged isopropyl alcohol was taken up into the syringe and added to the reactor through the injection port to rinse the port and syringe of residual hydrophobe. The slurry was then heated from 75° C. to 85° C. and held at 85° C. for three hours.

The slurry was cooled to room temperature and 5.50 g of glacial acetic acid were added by syringe. After stirring for 15 minutes, the polymer was collected by vacuum filtration through a fritted metal Buchner funnel. The polymer was washed in a Waring blender five times with 500 mL of 5:1 (by volume) acetone/water, and twice with 500 mL of pure acetone. 1.50 g of 40% glyoxal and 1.00 g of glacial acetic acid were added to the second acetone desiccation wash to glyoxal-treat the HmHEC. The polymer was dried in vacuo at 50° C. overnight, yielding 51.04 g of an off-white solid. The volatiles content was found to be 2.2%, the ash content (as sodium acetate) was found to be 6.3%, and EO MS was calculated to be 2.06 by mass gain. The 1% solution viscosity of the polymer (corrected for ash and volatiles) was found to be 8400 mPa-sec (Brookfield LVT, spindle #4, 30 rpm). The ethylene oxide MS (EO MS) was found to be 2.02 and the hexadecyl DS was found to be 0.0077 by Zeisel analysis.

In Table 1, D/C is the weight ratio of diluent to cellulosic starting material. A/C is the molar ratio of alkali (sodium hydroxide) to anhydroglucose unit in the cellulosic starting material: A/C 1 refers to the caustic charge during the ethoxylation step and A/C 2 refers to the adjusted caustic charge during the hydrophobe alkylation step. The sodium hydroxide was added as a 22% (by weight) solution except where indicated. EO/C ratio is the molar ratio of ethylene oxide to cellulosic starting material. H/C is the molar ratio of hydrophobe reactant to cellulosic starting material.

In Table 2, EO MS is the ethylene oxide molar substitution and hydrophobe DS is the hydrophobe degree of substitution determined by the Zeisel method (or spectrophotometry in the case of dodecyl phenyl glycidyl ether). The Brookfield viscosity was measured using a Brookfield LVT instrument and spindle #3 or #4, depending on the solution viscosity, at 30 rpm and at 25.0° C. The aqueous polymer concentration for these viscosity measurements is 1%, except as indicated. The solution viscosity is reported in centipoise (mPa-sec). MW is the weight-average molecular weight of the polymer measured by the SEC method described above. The dynamic solution viscosity (in mPa-sec) at 25° C. and 80° C. was determined using a TA Instruments AR-2000 oscillatory rheometer as described above.

In Table 3, the storage modulus was measured at 25° C. and 80° C. using the TA Instruments AR-2000 oscillatory rheometer as described above.

In Table 4, the percent retained dynamic viscosity at 80° C. was measured as described above and these data are the same as those compiled in Table 2. The critical association concentrations (reported in parts per million or ppm) were measured as described above.

Examples 1-7, 14-21 and 23-41 were prepared as described for Example 10, but with the cellulose starting material, the diluent system, the hydrophobe-containing reagents and the amounts listed in Table 1.

TABLE 1

Synthesis of the Nonionic Cellulose Ethers

| (Comparative) Example | Starting material | Diluent system | D/C | A/C 1 | EO/C | A/C 2 | Hydrophobe type | H/C |
|---|---|---|---|---|---|---|---|---|
| 1 | Borregaard UHV-17 wood pulp | 13.5% water in isopropyl alcohol | 13.1 | 1.34 | 4.51 | 0.41 | BHD | 0.174 |
| 2 | Tartas Biofloc XV wood pulp | 13.5% water in isopropyl alcohol | 13.1 | 1.38 | 4.14 | 0.43 | BHD | 0.178 |
| 3 | Tartas Biofloc XV wood pulp | 13.5% water in isopropyl alcohol | 13.1 | 1.40 | 4.72 | 0.43 | BHD | 0.193 |
| 4 | Tartas Biofloc XV wood pulp | 13.5% water in isopropyl alcohol | 13.1 | 1.40 | 4.30 | 0.43 | BHD | 0.211 |
| 5 | Tartas Biofloc XV wood pulp | 13.5% water in isopropyl alcohol | 13.1 | 1.38 | 4.48 | 0.49 | BHD | 0.221 |
| 6 | Tartas Biofloc XV wood pulp | 13.5% water in isopropyl alcohol | 13.1 | 1.38 | 4.48 | 0.49 | BHD | 0.221 |
| 7* | Tartas Biofloc XV wood pulp | 13.5% water in isopropyl alcohol | 13.1 | 1.38 | 4.14 | — | None | — |
| 8* | CELLOSIZE HEC QP-2000 | 13.5% water in isopropyl alcohol | 6.7 | — | — | 0.42 (50%) | BHD | 0.108 |
| 9 | CELLOSIZE HEC QP-4400H | 13.5% water in isopropyl alcohol | 6.7 | — | — | 0.42 (50%) | BHD | 0.108 |
| 10 | CELLOSIZE HEC QP-30,000H | 13.5% water in isopropyl alcohol | 6.7 | — | — | 0.42 (50%) | BHD | 0.108 |
| 11 | CELLOSIZE HEC WP-52MHP | 13.5% water in isopropyl alcohol | 6.7 | — | — | 0.42 (50%) | BHD | 0.108 |
| 12 | CELLOSIZE HEC QP-100MH | 13.5% water in isopropyl alcohol | 6.7 | — | — | 0.42 (50%) | BHD | 0.108 |
| 13 | CELLOSIZE HEC QP-100MH | 13.5% water in isopropyl alcohol | 6.7 | — | — | 0.42 (50%) | BHD | 0.108 |
| 14 | Tartas Biofloc XV wood pulp | 13.5% water in isopropyl alcohol | 13.7 | 1.40 | 4.72 | 0.43 | BHD | 0.193 |
| 15 | Tartas Biofloc XV wood pulp | 13.5% water in isopropyl alcohol | 13.7 | 1.40 | 4.72 | 0.43 | BHD | 0.193 |
| 16 | Tartas Biofloc XV wood pulp | 13.5% water in isopropyl alcohol | 13.7 | 1.40 | 4.72 | 0.43 | BHD | 0.193 |
| 17 | Tartas Biofloc XV wood pulp | 13.5% water in isopropyl alcohol | 13.7 | 1.40 | 4.72 | 0.43 | BHD | 0.193 |
| 18 | Tartas Biofloc XV wood pulp | 13.5% water in isopropyl alcohol | 13.7 | 1.40 | 4.72 | 0.43 | BHD | 0.193 |
| 19 | Tartas Biofloc XV wood pulp | 13.5% water in isopropyl alcohol | 13.7 | 1.40 | 4.72 | 0.43 | BHD | 0.193 |
| 20 | Tartas Biofloc 92 wood pulp | 13.5% water in isopropyl alcohol | 13.5 | 1.17 (50%) | 4.11 | 0.42 | BHD | 0.202 |
| 21 | Borregaard UHV-17 wood pulp | 13.5% water in isopropyl alcohol | 13.5 | 1.05 | 4.11 | 0.41 | BHD | 0.180 |
| 22 | Borregaard UHV-17 wood pulp | 13.5% water in isopropyl alcohol | 13.5 | 1.38 | 5.15 | 0.42 | BHD | 0.180 |
| 23 | Borregaard UHV-17 wood pulp | 13.5% water in isopropyl alcohol | 13.5 | 1.38 | 5.15 | 0.42 | BHD | 0.180 |
| 24 | Borregaard UHV-17 wood pulp | 13.5% water in isopropyl alcohol | 13.5 | 1.38 | 5.15 | 0.42 | BHD | 0.180 |
| 25 | Southern Cellulose 407 cotton linters | 13.5% water in isopropyl alcohol | 18.0 | 1.46 (50%) | 5.19 | 0.42 | BHD | 0.178 |
| 26 | Borregaard UHV-17 wood pulp | 13.5% water in isopropyl alcohol | 13.5 | 1.46 | 5.15 | 0.41 | BHD | 0.180 |
| 27 | Borregaard UHV-17 wood pulp | 13.5% water in isopropyl alcohol | 13.5 | 1.46 | 5.15 | 0.32 | BHD | 0.180 |
| 28 | Borregaard UHV-17 wood pulp | 13.5% water in isopropyl alcohol | 13.5 | 1.46 | 5.15 | 0.47 | BHD | 0.180 |
| 29 | Tartas Biofloc XV wood pulp | 13.5% water in isopropyl alcohol | 13.5 | 1.38 | 5.19 | 0.42 | BHD | 0.180 |
| 30 | Tartas Biofloc XV wood pulp | 13.5% water in isopropyl alcohol | 13.5 | 1.46 | 4.37 | 0.47 | BHD | 0.180 |
| 31 | Tartas Biofloc XV wood pulp | 13.5% water in isopropyl alcohol | 13.5 | 1.38 | 4.67 | 0.41 | BHD | 0.179 |
| 32 | Tartas Biofloc XV wood pulp | 13.5% water in isopropyl alcohol | 13.5 | 1.38 | 4.45 | 0.47 | BHD | 0.180 |
| 33 | Tartas Biofloc XV wood pulp | 13.5% water in isopropyl alcohol | 13.5 | 1.38 | 4.46 | 0.47 | BHD | 0.200 |
| 34 | Tartas Biofloc XV wood pulp | 13.5% water in isopropyl alcohol | 13.5 | 1.38 | 4.45 | 0.47 | BHD | 0.160 |
| 35 | Tartas Biofloc XV wood pulp | 13.5% water in isopropyl alcohol | 13.5 | 1.38 | 4.45 | 0.49 | BHD | 0.220 |
| 36* | Tartas Biofloc XV wood pulp | 13.5% water in isopropyl alcohol | 13.5 | 1.38 | 4.45 | 1.38 | BHD | 0.180 |
| 37* | Tartas Biofloc XV wood pulp | 13.5% water in isopropyl alcohol | 13.5 | 0.97 | 4.15 | 0.97 | BHD | 0.180 |

TABLE 1-continued

Synthesis of the Nonionic Cellulose Ethers

| (Comparative) Example | Starting material | Diluent system | D/C | A/C 1 | EO/C | A/C 2 | Hydrophobe type | H/C |
|---|---|---|---|---|---|---|---|---|
| 38 | Tartas Biofloc XV wood pulp | 13.5% water in isopropyl alcohol | 13.5 | 1.38 | 4.74 | 0.32 | BHD | 0.220 |
| 39 | Tartas Biofloc XV wood pulp | 13.5% water in isopropyl alcohol | 13.5 | 1.38 | 4.46 | 0.49 | BHD | 0.240 |
| 40 | Tartas Biofloc XV wood pulp | 13.5% water in isopropyl alcohol | 13.5 | 1.38 50% | 4.43 | 0.49 | BHD | 0.180 |
| 41* | Tartas Biofloc 94 wood pulp | 78.5% acetone, 11% ethanol, 10.5% water | 13.5 | 0.97 | 5.30 | 0.97 | BHD | 0.293 |
| 42* | Tartas Biofloc 94 wood pulp | 78.5% acetone, 11% ethanol, 10.5% water | 13.5 | 0.97 | 5.30 | 0.97 | BHD | 0.288 |
| 43* | Tartas Biofloc 92 wood pulp | 78.5% acetone, 11% ethanol, 10.5% water | 13.5 | 0.97 | 5.30 | 0.97 | BHD | 0.288 |
| 44* | Tartas Biofloc 92 wood pulp | 78.5% acetone, 11% ethanol, 10.5% water | 13.5 | 0.97 | 5.30 | 0.97 | BHD | 0.221 |
| 45 | Borregaard UHV-17 wood pulp | 78.5% acetone, 11% ethanol, 10.5% water | 13.5 | 0.97 | 5.30 | 0.97 | BHD | 0.297 |
| 46 | CELLOSIZE HEC QP-30,000H | 13.5% water in isopropyl alcohol | 6.7 | — | — | 0.42 (50%) | DPGE | 0.0424 |
| 47 | CELLOSIZE HEC QP-30,000H | 13.5% water in isopropyl alcohol | 6.7 | — | — | 0.42 (50%) | BTD | 0.110 |
| 48 | CELLOSIZE HEC QP-30,000H | 13.5% water in isopropyl alcohol | 6.7 | — | — | 0.42 (50%) | BOD | 0.0757 |
| 49* | CELLOSIZE HEC QP-30,000H | 13.5% water in isopropyl alcohol | 6.7 | — | — | 0.99 (50%) | BHD | 0.219 |
| 50* | Borregaard UHV-17 wood pulp | 13.5% water in isopropyl alcohol | 13.5 | 0.97 | 5.16 | 0.49 | BHD | 0.179 |

*= not an example of the invention
Caustic charge = 22%, except where indicated as 50%.
BHD = 1-bromohexadecane,
BOD = 1-bromooctadecane,
BTD = 1-bromotetradecane,
DPGE = dodecyl phenyl glycidyl ether

TABLE 2

Properties of the Nonionic Cellulose Ethers

| (Comp.) Example | Hydrophobe | | 1% Brookfield | MW | Dynamic solution viscosity, mPa-sec | | Viscosity retention |
|---|---|---|---|---|---|---|---|
| | EO MS | DS | | | 25° C. | 80° C. | Δ 80/25 |
| 1 | 1.81 | 0.0062 | 8960 | | 3341.8 | 1571.0 | 47.0% |
| 2 | 1.74 | 0.0038 | 7520 | | 3981.5 | 1292.2 | 32.5% |
| 3 | 2.12 | 0.0062 | 12000 | | 4417.6 | 2003.8 | 45.4% |
| 4 | 1.97 | 0.0038 | 10700 | | 4287.1 | 1621.3 | 37.8% |
| 5 | 2.09 | 0.0052 | 10600 | | 4159.8 | 1808.7 | 43.5% |
| 6 | 2.10 | 0.0051 | 12000 | 1.43E+06 | 4274.3 | 1960.9 | 45.9% |
| 7* | 2.19 | 0 | 4400 | | 3408.7 | 678.2 | 19.9% |
| 8* | 2.35 | 0.0092 | 3620 | 7.80E+0.5 | 1119.4 | 214.3 | 19.1% |
| 9 | 1.95 | 0.0076 | 6520 | 1.10E+06 | 2254.9 | 738.4 | 32.7% |
| 10 | 1.97 | 0.0090 | 6480 | 1.43E+06 | 3265.4 | 1479.0 | 45.3% |
| 11 | 1.81 | 0.0070 | 10600 | | 3863.8 | 1836.4 | 47.5% |
| 12 | 2.01 | 0.0092 | 9400 | | 4936.3 | 2597.1 | 52.6% |
| 13 | 2.02 | 0.0098 | 13720 | 1.78E+06 | 5499.7 | 3205.0 | 58.3% |
| 14 | 1.95 | 0.0059 | 8300 | 1.57E+06 | 4968.2 | 2458.3 | 49.5% |
| 15 | 1.94 | 0.0056 | 9200 | 1.55E+06 | 4939.5 | 2587.2 | 52.4% |
| 16 | 1.98 | 0.0065 | 10500 | 1.59E+06 | 4955.4 | 2607.9 | 52.6% |
| 17 | 1.88 | 0.0059 | 16000 | 1.52E+06 | 4745.4 | 2639.1 | 55.6% |
| 18 | 1.85 | 0.0054 | 16200 | 1.53E+06 | 4774.0 | 2474.2 | 51.8% |
| 19 | 1.99 | 0.0051 | 6900 | 1.63E+06 | 4420.6 | 1992.7 | 45.1% |
| 20 | 1.88 | 0.0069 | 6400 | 1.04E+06 | 2970.4 | 1334.2 | 44.9% |
| 21 | 1.92 | 0.0062 | 9180 | | 3510.5 | 1692.6 | 48.2% |
| 22 | 2.02 | 0.0077 | 8400 | | 3616.5 | 1860.6 | 51.4% |
| 23 | 2.32 | 0.0080 | 8503 | | 3399.1 | 1639.7 | 48.2% |
| 24 | 2.13 | 0.0082 | 7010 | 1.27E+06 | 3341.8 | 1434.1 | 42.9% |

TABLE 2-continued

Properties of the Nonionic Cellulose Ethers

| (Comp.) Example | EO MS | Hydrophobe DS | 1% Brookfield | MW | Dynamic solution viscosity, mPa-sec 25° C. | 80° C. | Viscosity retention Δ 80/25 |
|---|---|---|---|---|---|---|---|
| 25 | 2.26 | 0.0065 | 8300 | | 4914.1 | 2366.6 | 48.2% |
| 26 | 2.36 | 0.0063 | 11600 | | 3631.4 | 1666.1 | 45.9% |
| 27 | 2.27 | 0.0064 | 11600 | | 3637.8 | 1613.0 | 44.3% |
| 28 | 2.38 | 0.0070 | 7000 | | 3465.9 | 1540.7 | 44.5% |
| 29 | 2.76 | 0.0076 | 6120 | | 4611.7 | 2088.8 | 45.3% |
| 30 | 1.80 | 0.0041 | 8540 | | 4010.2 | 1446.2 | 36.1% |
| 31 | 2.32 | 0.0053 | 9900 | 1.46E+06 | 4586.3 | 2085.3 | 45.5% |
| 32 | 2.02 | 0.0041 | 10700 | | 4166.1 | 1656.9 | 39.8% |
| 33 | 2.03 | 0.0039 | 9960 | | 4245.7 | 1845.3 | 43.5% |
| 34 | 2.13 | 0.0039 | 8580 | | 3902.0 | 1551.6 | 39.8% |
| 35 | 2.25 | 0.0044 | 10100 | 1.41E+06 | 4233.0 | 1994.0 | 47.1% |
| 36* | 2.05 | 0.0018 | 4680 | | 3016.9 | 775.3 | 25.7% |
| 37* | 2.42 | 0.0041 | 3600 | | 1189.4 | 270.2 | 22.7% |
| 38 | 2.45 | 0.0053 | 10060 | | 4468.5 | 1977.7 | 44.3% |
| 39 | 2.33 | 0.0052 | 10460 | | 4315.7 | 2102.5 | 48.7% |
| 40 | 2.26 | 0.0053 | 8200 | | 3612.4 | 1588.2 | 44.0% |
| 41* | 3.64 | 0.0093 | 745 | | 569.1 | 22.4 | 3.9% |
| 42* | 3.46 | 0.0103 | 5040 | | 1259.4 | 152.5 | 12.1% |
| 43* | 3.28 | 0.0090 | 11120 | 9.51E+05 | 2115.5 | 551.2 | 26.1% |
| 44* | 3.34 | 0.0058 | 3200 | | 1034.7 | 111.3 | 10.8% |
| 45 | 3.30 | 0.0072 | 15320 | | 2378.1 | 960.9 | 40.4% |
| 46 | 2.00 | 0.0110 | 12300 | | 3618.7 | 1442.1 | 39.9% |
| 47 | 2.43 | 0.0138 | 14900 | | 4379.4 | 1711.3 | 39.1% |
| 48 | 2.27 | NM | 6880 | | 4089.8 | 1484.4 | 36.3% |
| 49* | 2.05 | 0.0159 | Insoluble | | NM | NM | NM |
| 50* | 2.65 | 0.0155 | Insoluble | | NM | NM | NM |
| A (CELLOSIZE ™ HEC QP-2000) | 2.0 | 0 | 232 | 7.80E+05 | 231.3 | 26.64 | 11.5% |
| B (CELLOSIZE HEC QP-4400H) | 2.4 | 0 | 5940 (2%) | 1.10+E06 | 668.4 | 74.57 | 11.2% |
| C (CELLOSIZE ™ HEC QP-30MH) | 2.0 | 0 | 3071 | 1.43E+06 | 2017.8 | 301.2 | 14.9% |
| D (CELLOSIZE ™ HEC QP-100MH) | 2.0 | 0 | 6900 | 1.78E+06 | 4303.0 | 846.6 | 19.7% |
| E CELLOSIZE ™ HEC QP-100MH) | 2.48 | 0 | 4400 | | 3927.4 | 732.0 | 18.6% |
| F (NATROSOL ™ HE 10K HmHEC from year 2004) | 2.55 | 0.0064 | 8020 | 1.07E+6 | 3596.4 | 402.9 | 11.2% |
| G (NATROSOL ™ HE 10K HmHEC from year 2009) | 3.34 | 0.0071 | 6340 | 1.10E+6 | 2220.9 | 608.5 | 27.4% |
| H (NATROSOL ™ Plus 330 HmHEC) | 3.60 | 0.0097 | 910 | 5.75E+05 | 500.6 | 27.90 | 5.6% |
| I (NATROSOL ™ Plus 330 HmHEC, different sample) | 3.47 | 0.0096 | 915 | 5.64E+05 | 518.5 | 30.13 | 5.8% |
| J (CELLOSIZE ™ HMHEC 500) | 3.56 | 0.0070 | 3120 | 1.06E+06 | 1396.9 | 197.3 | 14.1% |
| K (TYLOSE ™ HX 8000) | 2.32 | — | 1164 | 6.32E+05 | 489.5 | 24.93 | 5.1% |

*= not an example of the invention
NM: Not measured

TABLE 3

Storage Moduli and Percent Retained Storage Moduli at 80° C.

| (Comparative) Example | Storage modulus, Pa 25° C. | 80° C. | Storage modulus retention at 80° C. |
|---|---|---|---|
| A (CELLOSIZE ™ HEC QP-2000) | 0.125 | 0 | 0 |
| C (CELLOSIZE ™ HEC QP-30MH) | 3.86 | 0.226 | 5.8% |
| D (CELLOSIZE ™ HEC QP-100MH) | 10.5 | 0.961 | 9.2% |
| F (NATROSOL ™ HE 10K HmHEC from year 2004) | 11.3 | 1.27 | 11.2% |
| G (NATROSOL ™ HE 10K HmHEC from year 2009) | 13.5 | 1.11 | 8.2% |
| H (NATROSOL ™ Plus 330 HmHEC) | 1.28 | 0.0002 | 0 |
| I (NATROSOL ™ Plus 330 HmHEC, different sample) | 1.31 | 0.0013 | 0.1% |

TABLE 3-continued

Storage Moduli and Percent Retained Storage Moduli at 80° C.

| (Comparative) Example | Storage modulus, Pa 25° C. | Storage modulus, Pa 80° C. | Storage modulus retention at 80° C. |
|---|---|---|---|
| J (CELLOSIZE ™ HMHEC 500) | 4.76 | 0.136 | 2.9% |
| K (TYLOSE ™ HX 8000) | 0.681 | 0 | 0 |
| 1 | 22.8 | 5.65 | 24.8% |
| 2 | 22.6 | 5.44 | 24.1% |
| 3 | 26.2 | 7.77 | 29.7% |
| 4 | 20.9 | 5.21 | 24.9% |
| 5 | 23.3 | 6.59 | 28.3% |
| 6 | 24.5 | 7.01 | 28.6% |
| 7* | 9.28 | 0.93 | 10.0% |
| 8* | 5.64 | 0.36 | 6.5% |
| 9 | 11.14 | 1.33 | 11.9% |
| 10 | 32.5 | 6.05 | 18.6% |
| 11 | 29.3 | 7.18 | 24.5% |
| 12 | 55.7 | 11.9 | 21.4% |
| 13 | 75.9 | 18.6 | 24.5% |
| 14 | 41.1 | 12.2 | 29.6% |
| 15 | 44.6 | 13.3 | 29.8% |
| 16 | 44.8 | 13.5 | 30.0% |
| 17 | 40.6 | 12.9 | 31.8% |
| 18 | 40.0 | 11.6 | 29.8% |
| 19 | 31.3 | 8.84 | 28.2% |
| 20 | 16.4 | 2.57 | 15.7% |
| 21 | 25.6 | 6.47 | 25.3% |
| 22 | 31.8 | 8.59 | 27.0% |
| 23 | 31.6 | 9.87 | 31.2% |
| 24 | 33.8 | 6.28 | 18.6% |
| 25 | 40.9 | 9.85 | 24.1% |
| 26 | 24.9 | 6.11 | 24.6% |
| 27 | 25.0 | 6.19 | 24.8% |
| 28 | 28.3 | 6.23 | 22.0% |
| 29 | 47.8 | 10.9 | 22.7% |
| 30 | 22.5 | 4.45 | 19.7% |
| 31 | 29.2 | 8.43 | 28.8% |
| 32 | 20.2 | 5.43 | 26.9% |
| 33 | 26.6 | 6.68 | 25.1% |
| 34 | 22.6 | 4.84 | 21.4% |
| 35 | 6.84 | 0.66 | 9.7% |
| 36* | 10.25 | 1.50 | 14.6% |
| 37* | 5.90 | 0.445 | 7.5% |
| 38 | 26.8 | 7.66 | 28.6% |
| 39 | 28.3 | 7.42 | 26.2% |
| 40 | 31.0 | 8.45 | 27.2% |
| 41* | 1.31 | 0 | 0 |
| 42$ | 5.6 | 0.110 | 2.0% |
| 43* | 14.7 | 0.847 | 5.8% |
| 44* | 3.4 | 0.0334 | 1.0% |
| 45 | 17.5 | 2.01 | 11.5% |
| 46 | 37.7 | 4.53 | 12.0% |
| 47 | 38.9 | 6.69 | 17.2% |
| 48 | 25.1 | 4.79 | 19.1% |

*= not an example of the invention

TABLE 4

Critical Association Concentration of Selected HmHEC Polymers

| (Comparative) Example | Percent retained dynamic viscosity at 80° C. | Critical association concentration, ppm |
|---|---|---|
| 2 | 32.5% | 14 |
| 17 | 55.6% | 13 |
| 31 | 45.5% | 13 |
| 41* | 3.9% | 29 |
| 42 | 12.1% | 28 |
| 43 | 26.1% | 18 |
| 44* | 10.8% | 21 |
| 45 | 40.4% | 14 |
| F (NATROSOL ™ HE 10K HmHEC from year 2004) | 11.2% | 22 |
| G (NATROSOL ™ HE 10K HmHEC from year 2009) | 27.4% | 17 |
| H (NATROSOL ™ Plus 330 HmHEC) | 5.6% | 36 |
| I (NATROSOL ™ Plus 330 HmHEC, different sample) | 5.8% | 30 |
| J (CELLOSIZE ™ HMHEC 500) | 14.1% | 20 |
| K (TYLOSE ™ HX 8000) | 5.1% | 44 |

*= not an example of the invention

What is claimed is:

1. A nonionic cellulose ether having hydroxyethyl groups and being further substituted with one or more hydrophobic substituents, wherein the cellulose ether has at least one of the properties a), b) or c):
   a) a retained dynamic viscosity, % $\eta_{80/25}$, of at least 30 percent, wherein % $\eta_{80/25}$=[dynamic solution viscosity at 80° C./dynamic solution viscosity at 25° C.]×100, the dynamic solution viscosity at 25° C. and 80° C. being measured as 1% aqueous solution;
   b) a storage modulus of at least 15 Pascals at 25° C. and a retained storage modulus, % $G'_{80/25}$, of at least 12 percent, wherein % $G'_{80/25}$=[storage modulus at 80° C./storage modulus at 25° C.]×100, the storage modulus at 25° C. and 80° C. being measured as a 1% aqueous solution;
   c) a critical association concentration of less than 15 ppm as measured by light-scattering,
   wherein said hydrophobic substituents are acyclic or cyclic, saturated or unsaturated, branched or linear hydrocarbon groups having at least 8 carbon atoms.

2. The nonionic cellulose ether of claim 1 having a weight average molecular weight of at least 1,000,000 and at least one of the properties a), b) and c).

3. The nonionic cellulose ether of claim 2 having a weight average molecular weight of at least 1,300,000.

4. The nonionic cellulose ether of claim 1 having a Brookfield viscosity of at least about 5000 mPa-sec, measured as 1% aqueous solution at 30 rpm, spindle #4 at 25° C. and at least one of the properties a), b) and c).

5. The nonionic cellulose ether of claim 4 having a Brookfield of at least 6000 mPa-sec, measured as 1% aqueous solution at 30 rpm, spindle #4 at 25° C.

6. The nonionic cellulose ether of claim 1 having a retained dynamic viscosity % $\eta_{80/25}$ of at least 30 percent.

7. The nonionic cellulose ether of claim 6 having a retained dynamic viscosity % $\eta_{80/25}$ of at least 35 percent.

8. The nonionic cellulose ether of claim 1 having a storage modulus of at least 15 Pascals at 25° C. and a retained storage modulus % $G'_{80/25}$ of at least 12 percent.

9. The nonionic cellulose ether of claim 8 having a storage modulus of at least 21 Pascals at 25° C.

10. The nonionic cellulose ether of claim 7 or 8 having a retained storage modulus % $G'_{80/25}$ of at least 15 percent.

11. The nonionic cellulose ether of claim 1 having a critical association concentration of less than 15 ppm as measured by light-scattering.

12. The nonionic cellulose ether of claim 1 having a hydroxyethyl molar substitution of from 1.5 to 3.5 and being further substituted with one or more hydrophobic substituents.

13. The nonionic cellulose ether of claim 1 wherein the average level of substitution with said one or more hydrophobic substituents is from 0.0003 to 0.0200 moles per mole of anhydroglucose unit.

14. A method of producing the nonionic cellulose ether of claim 1 comprising the step of first reacting hydroxyethyl cellulose with an alkali metal hydroxide at a mole ratio of alkali metal hydroxide to cellulose of 0.2 to 1.5, and then with a hydrophobe-containing reagent.

15. A method of producing the nonionic cellulose ether of claim 1 comprising the steps of
   a) reacting cellulose with an alkali metal hydroxide at a mole ratio of alkali metal hydroxide to cellulose of 0.2 to 2.0 to prepare alkali cellulose; and
   b) alkylating said alkali cellulose with ethylene oxide; and
   c) reacting with a hydrophobe-containing reagent after adjusting the mole ratio of alkali metal hydroxide to cellulose of 0.1 to 1.0.

16. The method of claim 14 or 15 wherein the reaction with an alkylating agent, and the hydrophobe-containing reagent is conducted in aqueous isopropyl alcohol.

17. A composition comprising the nonionic cellulose ether of claim 1.

* * * * *